United States Patent Office 3,003,361
Patented Oct. 10, 1961

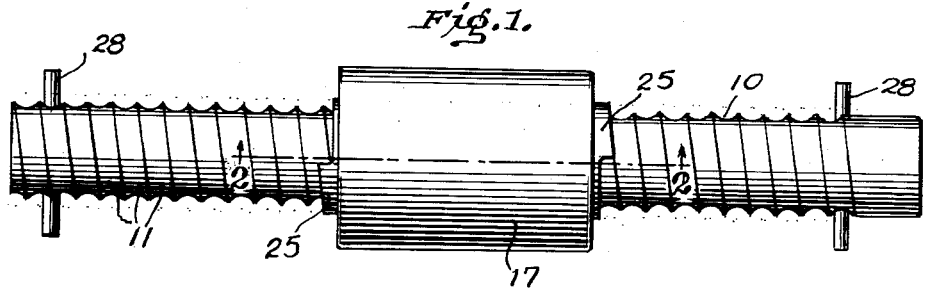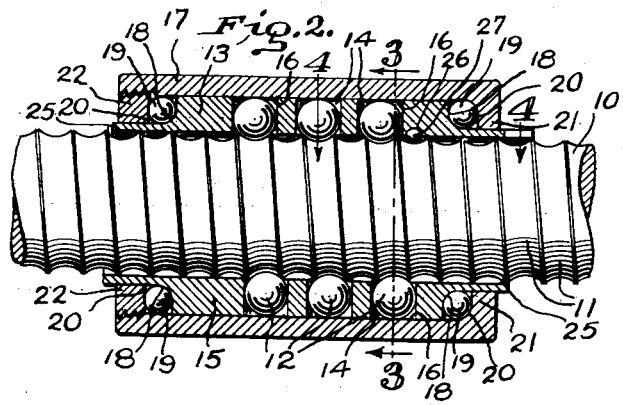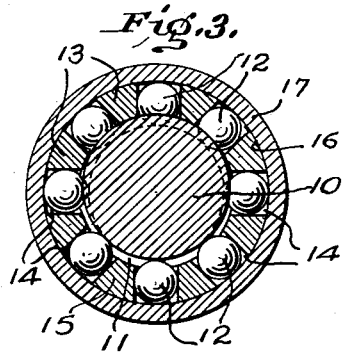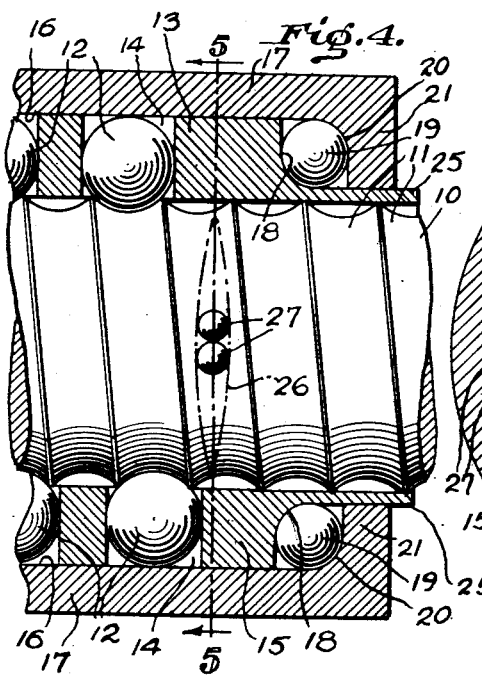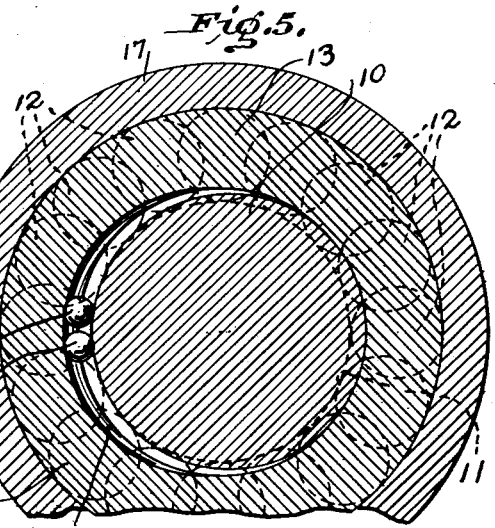

3,003,361
BALL BEARING SCREW AND NUT ASSEMBLY
Ernest D. Boutwell, 306 Webber St., Saginaw, Mich.
Filed Aug. 5, 1960, Ser. No. 47,854
8 Claims. (Cl. 74—424.8)

This invention relates to ball bearing screw and nut assemblies, and essentially consists of a further development of the invention shown and described in my copending application entitled Ball Bearing Screw Assembly, Serial No. 847,819 filed October 21, 1959, now abandoned.

Generally, the present invention comprises a helically grooved shaft closely fitted within a co-axial cylindrical ball cage, which in turn is closely fitted and axially fixed within a smooth internal cylindrical wall surface of a nut element, there being apertures through the cylindrical wall of the ball cage which are arranged along a helical angle corresponding to that of the groove in the shaft, and which have therein balls that engage in the helical groove in the shaft and with the smooth internal surface of the nut element. Bearing races of combination radial and thrust ball bearings are constructed on the opposite end portions of the ball cage and the nut element so as to both axially fix and rotatably mount said cage within said nut. Closely fitting the apertured ball cage to the screw shaft and the nut element not only provides a cage wall thickness that withstands substantial loads, but also a wall of sufficient thickness so as to efficiently construct ball races of thrust bearings directly on its opposite end portions by simply reducing the outer diameter of said end portions. A bearing constructed in this manner lies within the smooth inner surface of the nut element, which together with the fact that one bearing shoulder on the nut element is a ring which is fixed in place during a final step of assembly, permits relative rotatable operative relationship in assembling the ball cage with the shaft and nut. The reduced ends of the cage project beyond the shoulders on the nut element and are adapted to engage cross pins on the helically grooved shaft for limiting endwise movement of the nut element even though said helically grooved shaft continues to rotate. When the device is not in operation and the nut and shaft are held against turning movement relative to one another, it is necessary that the ball cage also be held against turning, otherwise such cage movement if permitted to occur would produce a feeding of the nut lengthwise on the shaft. To keep the ball cage from turning due to a shake down caused by vibrations, or for any other reason, there is a short transverse groove in and eccentric to the inner cylindrical face of the ball cage, which has therein balls that also engage in the helical groove in the shaft. The eccentricity of the transverse groove together with the fact that the pitch of the helical groove is at an angle to said transverse groove will produce a double pinch on said balls should the cage attempt to turn relative to a stationary shaft and nut.

It is accordingly an object of the invention to provide a ball bearing screw assembly of the above indicated character employing an axially fixed rotatable ball cage within a nut element to operate as a primary thrust sustaining member.

Another object of the invention is to provide, in a device of the character set forth, a ball cage having a wall thickness sufficient to efficiently construct on opposite end portions thereof ball races of thrust bearings for axially fixing the cage within a nut element.

A further object of the invention is to provide, in a device of the above indicated character, combination radial and thrust ball bearings within an internally shouldered nut element for axially fixing and rotatably mounting a ball cage within said nut element and on the shoulders thereof.

Another object of the invention is to provide, in a device as set forth in the preceding object wherein there is a permanent shoulder on one end of the nut element and an attachable shoulder on its opposite end for assembly purposes.

A still further object of the invention is to provide, in a device of the character set forth reduced cylindrical end portions on the ball cage which project beyond the end of the nut element, and which are adapted to engage stop pins on a screw shaft for limiting endwise movement of the nut element independent of continued rotation of the screw shaft.

A still further object of the invention is to provide, in a device of the character indicated, a pocket in the inner cylindrical face of the ball cage for the retention of at least one ball which also engages in the helical groove in the shaft for producing a binding action between the cage and shaft should the ball cage attempt to turn relative to a stationary shaft and nut.

It is also an object of the present invention to provide a ball bearing screw assembly which is simple and substantial in construction, economical to manufacture, and thoroughly efficient and practical in use.

These, together with various auxiliary features and objects of the invention which will later become apparent as the following description proceeds are attained by the present invention, a preferred embodiment of which has been illustrated, by way of example only, in the accompanying drawing, wherein:

FIGURE 1 is a side elevation of the improved ball bearing screw assembly;

FIGURE 2 is an enlarged longitudinal fragmentary section taken on line 2—2 of FIGURE 1;

FIGURE 3 is a cross section taken on line 3—3 of FIGURE 2, looking in the direction of the arrows;

FIGURE 4 is a further enlarged fragmentary longitudinal section taken substantially on line 4—4 of FIGURE 2; and FIGURE 5 is a cross section taken on line 5—5 of FIGURE 4, looking in the direction of the arrows.

Referring more particularly to the accompanying drawing wherein like numerals designate similar parts throughout the various views, the numeral 10 indicates a screw shaft having a helical groove 11 in its outer surface and into which is partially received each of a plurality of balls 12 retained in a circumferentially spaced relation by a cylindrical ball cage 13 encircling said shaft and coaxial therewith, there being circular apertures 14 through the cylindrical wall 15 of the ball cage 13, which are arranged along a helical angle corresponding to that of the groove 11, and in which are the balls 12. The balls 12 besides protruding inwardly of the inner cylindrical surface of the ball cage for engaging in the helical groove 11, also protrude outwardly beyond the outer cylindrical surface of said cage and engage a smooth internal surface 16 of a nut element 17 encircling said cage and coaxial therewith. The groove 11 is of circular arc contour in cross section and is of a radius slightly larger than that of the balls 12 so as to cause the balls to slightly climb the slope of the groove 11 and thereby produce radially outward movement of the balls into firm engagement with the cylindrical internal surface 16 of the nut element 17.

The perforated cylindrical wall 15 of the ball cage 13 is of a thickness within a few thousandths of an inch of filling the space between the grooved outer surface of the shaft 10 and the smooth internal surface 16 of the nut element 17 so as to obtain sufficient end size of the cage for the construction of a circular ball race 18 of a combination radial and thrust ball bearing 19 on each end of said ball cage and within said smooth internal surface of said nut element. The other races 20 of the bearings 19 are constructed on the inner faces of annular internal shoulders 21 and 22 on opposite ends of the nut element, which together with the races 18 and balls of said bearings axially fix and rotatably mount said cage relative to said nut element. For assembly purpose the annular internal shoulder 22 is a separate piece from the nut element and is in the form of a ring which is threaded and permanently secured to the nut element 17, as a final step of assembly, by peening the ring in place. Constructing the bearing faces 18 on this thick walled cage 13 merely requires a stepped reduction of the outer diameter of the wall and thereby providing thin walled end portions 25 which project outwardly of the shouldered ends of the nut element for a purpose to be set forth as the description proceeds.

There is a short transverse groove 26 in and eccentric to the inner cylindrical face of the ball cage 13, which has a pair of balls 27 therein that also engage in the helical groove 11 of the screw shaft 10. The balls 27 are of a diameter considerably less than a fit to the radius of the circular arc cross sectional contour of the groove 11 and are supported in a manner in the transverse groove 26 so as to climb the arc bottom of the eccentric transverse groove 26 and the arc cross sectional surface of the helical groove 11 which is positioned at a slight angle thereto because of the pitch of said helical groove. This causes a binding of the balls 27 between the cage and the shaft which prohibits turning of the cage while the shaft and nut are being held. Should the cage be permitted to turn while holding the shaft and nut element against turning, it would produce a feeding of the nut element lengthwise on the shaft.

By rotating the screw shaft 10 while restraining the nut element 17 against rotation therewith, the helical groove 11 in said shaft will drive the balls 12 around the smooth internal surface 16 of the nut element and the freely rotatable cage 13 will rotate with the balls thereby moving the cage 13 in an axial direction relative to the screw shaft 10. Because of the bearings 19 which axially fix the cage relative to the nut element, said nut element will also be moved axially with said cage. It can thus be seen that the operation of forces transmitted through the balls 12 from the screw shaft 10 to the cage 13, and bearings 19 and nut element 17, require that these parts be of maximum strength, which accounts for the thick wall 15 of the cage and large end bearings 19.

The reduced end portions 25 of the ball cage not only serve the purpose of siding in the confinement of the balls of the bearings 19, but also are adapted to engage stationary abutments, such as shown in FIGURE 1 and designated by the numeral 28, for limiting endwise movement of the nut element 17 independent of continued rotation of the screw shaft 10. While there is shown and described a pair of balls 27 in an eccentric transverse groove 28 to prevent longitudinal movement of the nut element 17 on the shaft 10 because of a shake down of the ball cage 13, it is to be understood that a single ball 27 snugly seated in a cup-shaped recess in the ball cage and engaging in the helical groove 11, may be employed and the angle relationship of the groove 11 solely relied upon to produce the desired binding action.

It is to be understood that even though there is herein shown and described a single helical groove 11 in the shaft 10 for actuation of the balls 12, there could just as well be a number of helical grooves and that their pitch may be varied so as to obtain different amounts of axial movement of the nut element per rotation of the shaft.

It should also be understood that the ball apertures 14 in the cage 13 may be spaced to provide a staggered relation along the helical turns in order to accommodate the maximum number of balls. The actual spacing and number of such apertures can, of course, be varied to suit the load conditions for which the ball bearing screw assembly is designed.

In view of the foregoing description taken in conjunction with the accompanying drawing, it is believed that a clear understanding of the construction, operation, and advantages of the device will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. A ball-bearing screw and nut assembly comprising a screw shaft having a helical groove of arc contour in cross-section in its outer surface, a co-axial cylindrical ball cage having apertures through the wall thereof and arranged along a helical angle corresponding to that of said groove, an outer cylindrical thrust-sustaining nut element having said cage rotatably mounted therein and axially fixed relative thereto, balls in said cage apertures and engaging in said helical groove and the inner cylindrical surface of said nut element, said cage also having a recess internally thereof, and at least one ball of smaller size than that of said first mentioned balls held partially in said recess by engaging in said helical groove.

2. A ball-bearing screw and nut assembly as defined in claim 1 wherein said last mentioned ball is of a diameter considerably less than a fit to the radius of the cross-sectional arc contour of the helical groove.

3. A ball-bearing screw and nut assembly comprising a screw shaft having a helical groove of arc contour in cross-section in its outer surface, a co-axial cylindrical ball cage having apertures through the wall thereof and arranged along a helical angle corresponding to that of said groove, an outer cylindrical thrust-sustaining nut element having said cage rotatably mounted therein and axially fixed relative thereto, balls in said cage apertures and engaging in said helical groove and the inner cylindrical surface of said nut element, said cage also having a transverse groove in the internal cylindrical face thereof and extending partially therearound, and at least one ball of smaller size than that of said first mentioned balls held partially in said transverse groove by engagement in said helical groove.

4. A ball-bearing screw and nut assembly as defined in claim 3 wherein said transverse groove is eccentric to the internal cylindrical face of the cage.

5. A ball-bearing screw and nut assembly comprising a screw shaft having a helical groove of arc contour in cross section in its outer surface, a co-axial cylindrical ball cage having apertures through the wall thereof and arranged along a helical angle corresponding to that of said groove, an outer cylindrical thrust-sustaining nut element having said cage rotatably mounted therein and axially fixed relative thereto, balls in said cage apertures and engaging in said helical groove and the inner cylindrical surface of said nut element, said cage also having a transverse groove in and eccentric to the internal cylindrical surface thereof and extending partially therearound, said transverse groove being at an angle to the helical groove in the shaft due to the pitch of said helical groove, and at least one ball partially in said transverse groove and partially in said helical groove.

6. A ball bearing screw and nut assembly comprising a screw shaft member having a helical groove in its external surface; a cylindrical ball cage member receiving said shaft member and having apertures in its wall; an outer nut element receiving said cage member; means interposed between said nut element and said cage member for restraining relative axial movement thereof while permitting relative rotation therebetween; ball bearings rotatably received in the apertures of said cage member and engaging said groove and the interior surface of said nut element; and means interposed between said cage member and said shaft member operable to exert a binding force on said members to prevent relative movement therebetween when said nut element and said shaft member are restrained against relative rotation.

7. The assembly set forth in claim 6 wherein said force exerting means comprises at least one ball partially received in the groove of said shaft member and partially received in a groove formed in said cage member.

8. The assembly set forth in claim 7 wherein the groove formed in said cage member has a pitch different than the pitch of the groove formed in said shaft member.

References Cited in the file of this patent

UNITED STATES PATENTS

| | | |
|---|---|---|
| 696,777 | Ward | Apr. 1, 1902 |
| 2,350,538 | Selnes | June 6, 1944 |
| 2,795,149 | Morris | June 11, 1957 |
| 2,844,969 | Lohr | July 29, 1958 |

FOREIGN PATENTS

| | | |
|---|---|---|
| 405,525 | Italy | Aug. 18, 1943 |